(12) United States Patent
Collins (10) Patent No.: US 10,359,530 B2
(45) Date of Patent: Jul. 23, 2019

(54) ACOUSTIC ANISOTROPY LOG VISUALIZATION

(71) Applicant: HALLIBURTON ENERGY SERVICES, INC., Houston, TX (US)

(72) Inventor: Mark Vincent Collins, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 114 days.

(21) Appl. No.: 15/533,962

(22) PCT Filed: Aug. 28, 2015

(86) PCT No.: PCT/US2015/047443
§ 371 (c)(1),
(2) Date: Jun. 7, 2017

(87) PCT Pub. No.: WO2017/039584
PCT Pub. Date: Mar. 9, 2017

(65) Prior Publication Data
US 2017/0329031 A1 Nov. 16, 2017

(51) Int. Cl.
| | |
|---|---|
| *G06F 19/00* | (2018.01) |
| *G01V 1/50* | (2006.01) |
| *G01V 1/28* | (2006.01) |
| *G01V 1/30* | (2006.01) |
| *G01V 1/34* | (2006.01) |
| *E21B 47/10* | (2012.01) |

(Continued)

(52) U.S. Cl.
CPC .............. *G01V 1/50* (2013.01); *E21B 47/101* (2013.01); *E21B 49/00* (2013.01); *G01V 1/284* (2013.01); *G01V 1/306* (2013.01); *G01V 1/34* (2013.01); *E21B 47/18* (2013.01); *G01V 2210/47* (2013.01); *G01V 2210/626* (2013.01); *G01V 2210/74* (2013.01)

(58) Field of Classification Search
CPC ..... G01V 1/50; A61N 1/0529; A61N 1/36064
USPC .................. 702/11, 12, 13, 14, 182–185
See application file for complete search history.

(56) References Cited

U.S. PATENT DOCUMENTS

| | | |
|---|---|---|
| 5,712,829 A | 1/1998 | Tang et al. |
| 6,526,354 B2 | 2/2003 | Bose et al. |

(Continued)

FOREIGN PATENT DOCUMENTS

WO 2004/063772 7/2004

OTHER PUBLICATIONS

PCT International Search Report and Written Opinion, dated May 25, 2016, Appl No. PCT/US2015/047443, "Acoustic Anisotropy Log Visualization, " filed Aug. 28, 2015, 19 pgs.

(Continued)

*Primary Examiner* — Edward Raymond
(74) *Attorney, Agent, or Firm* — Gilliam IP PLLC (57) ABSTRACT

An acoustic logging method includes obtaining first horizontal transverse isotropy ("HTI") angles resulting from a time domain HTI algorithm. The method further includes obtaining one or more second HTI angles resulting from a frequency domain HTI algorithm. The method further includes generating a first HTI anisotropy log including a relative angle log based on the first and second HTI angles. The method further includes generating a first color map of the first HTI anisotropy log and displaying the first color map.

22 Claims, 10 Drawing Sheets

(51) Int. Cl.
*E21B 49/00* (2006.01)
*E21B 47/18* (2012.01)

(56) References Cited

U.S. PATENT DOCUMENTS

| | | |
|---|---|---|
| 7,643,374 B2 | 1/2010 | Plona et al. |
| 2004/0001388 A1 | 1/2004 | Kriegshauser et al. |
| 2009/0185446 A1 | 7/2009 | Zheng et al. |
| 2012/0026831 A1 | 2/2012 | Mickael |
| 2014/0195160 A1 | 7/2014 | Astigarraga |
| 2014/0222346 A1 | 8/2014 | Collins et al. |
| 2017/0285195 A1* | 10/2017 | Pei .................. G01V 1/303 |

OTHER PUBLICATIONS

X. M Tang et al., "Quantitative Borehole Acoustic Methods," Handbook of Geophysical Exploration: Seismic Exploration, vol. 25, 2004, pp. 75-80, 157-158, 159-164, & pp. 170-171.
Sinha, B. K. et al., "Borehole Flexural Modes in Anisotropic Formations," Geophysics, 59, 1994, pp. 1037-1052.
Sinha, B. K. et al., "Stress Induced Azimuthal Anisotropy in Borehole Flexural Waves," Geophysics, 61, No. 6, 1996, pp. 1899-1907.

\* cited by examiner

ACOUSTIC ANISOTROPY LOG VISUALIZATION

BACKGROUND

In the oil and gas industry, companies employ many data-gathering techniques. The most detailed, albeit localized, data comes from well logging. During the well-drilling process, or shortly thereafter, drillers pass logging instruments through the well bore to collect information about the surrounding formations. The information is traditionally collected in "log" form, i.e., a table, chart, or graph of measured data values as a function of instrument position.

Acoustic logging tools provide measurements of acoustic wave propagation speeds through the formation. There are multiple wave propagation modes that can be measured including compressional and flexural. Taken together, the propagation speeds of these various modes often indicate formation density and porosity, properties that are useful for determining the location of hydrocarbon gases and fluids.

Acoustic logging measurements are also valuable for determining the velocity or slowness of structure of subsurface formations, which is useful for obtaining accurate images of the subsurface formation structure. Subsurface formations are often anisotropic, meaning that the acoustic waves' propagation speed depends on the direction in which the waves propagate. Many formations exhibit acoustic anisotropy with the rotational axis of symmetry orthogonal to the borehole. This anisotropy is often called azimuthal anisotropy because the material properties are different at different azimuths around the borehole. (This type of anisotropy is also known as horizontal transverse isotropy ("HTI") because the axis of symmetry is horizontal in a vertical well.) Azimuthal anisotropy is useful for characterizing stress fields, optimizing plans for developing and draining a reservoir, determining fracture orientations and extent, and detecting near well bore damage.

However, it is difficult to accurately represent such anisotropy while conveying relevant data for timely evaluation. Without adequate representation, reservoirs cannot be delineated from surrounding formations and the presence of formation boundaries, laminations, and fractures, cannot be detected. As such, reservoir engineers cannot formulate a production strategy that maximizes economic value in a timely manner.

BRIEF DESCRIPTION OF THE DRAWINGS

Accordingly, there are disclosed herein various systems and methods for visualizing acoustic anisotropy logs. In the following detailed description of the various disclosed embodiments, reference will be made to the accompanying drawings in which.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by systems and methods for visualizing acoustic anisotropy logs. For example, color maps may be color coded images of attributes (relative angle, signed percent anisotropy, backrotation similarity, etc.) as a function of depth (or borehole position) and frequency. Additionally, time and frequency attributes may be combined to aid in evaluating anisotropy type. For example, an angle from a time-domain horizontal transverse isotropy ("HTI") algorithm and an angle-frequency combination from a frequency-domain HTI algorithm may be applied over a continuous and relatively large frequency band in a color map. Such color maps may aid the process of evaluating anisotropy type. The use of colors is for differentiation purposes and includes the use of different shades and different patterns as well as the use of different shades of grey, black, and white. A discussion of HTI anisotropy types will be helpful.

HTI anisotropy in a vertical well may occur due to vertical fracture planes. Because fractures tend to align with the direction of maximum stress, vertical fractures often occur in deep wells where the stress field is dominated by the vertical overburden. HTI anisotropy is also seen in wells that are inclined or parallel to laminated beds. A flexural wave polarized in the plane of the fractures or bedding travels faster than a flexural wave polarized normal to the plane. Anisotropy caused by fractures or bedding planes is called intrinsic anisotropy. One characteristic of intrinsic anisotropy is that the dispersion curves (slowness of the fast and slow flexural waves as a function of frequency) are separated at all frequencies and do not cross. Measuring intrinsic anisotropy is useful for evaluating hydraulic fracture stimulation and finding fracture orientation and extent.

A second type of HTI anisotropy is stress induced. Many rocks in formations have porosity and microcracks, making their elastic properties sensitive to the ambient stress field. Such a formation will exhibit HTI anisotropy if the two principal stresses transverse to the borehole are unequal. Due to the presence of the borehole, the stress varies as a function of radial distance from the borehole as well as in azimuth. Because depth of penetration increases with decreasing frequency, the fast and slow dispersion curves tend to cross over rather than remain separated as above, and the azimuth angle of the fast principal wave sharply changes approximately 90 degrees. Estimating the horizontal stress field and its orientation are an important aspect of formation evaluation and a governing factor in the optimization of the development and drainage of a reservoir.

A third type of HTI anisotropy occurs if the near-well bore is damaged in an otherwise isotropic formation. Consequently, the fast and slow dispersion curves are coincident at low frequencies and separate at high frequencies. Evaluating anisotropy type is useful when assessing formations, and the following systems and methods for visualizing anisotropy using anisotropy color maps aid the process of evaluating anisotropy type.

Figures 1, 2:
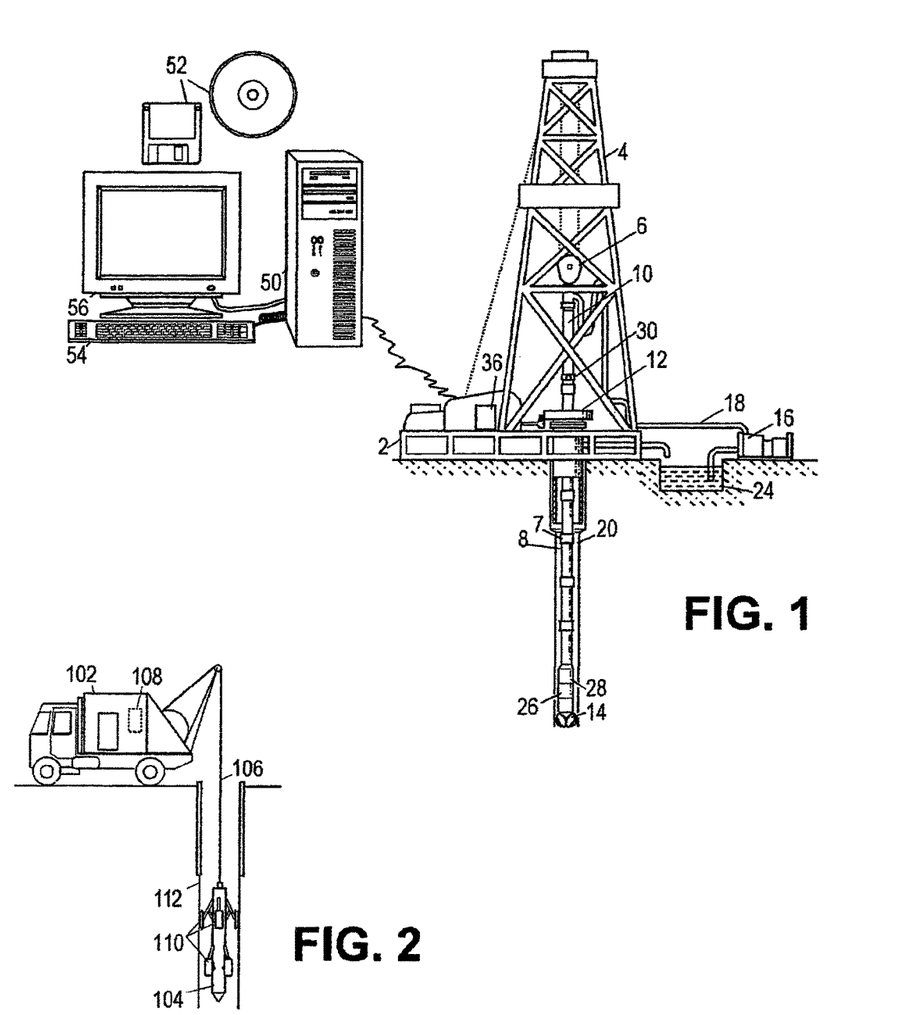
FIG. 1 is a contextual view of an illustrative logging while drilling ("LWD") environment.
FIG. 2 is a contextual view of an illustrative wireline environment.

To illustrate a context for the disclosed systems and methods, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated and drilling is accomplished by rotating the drill string 8, by use of a downhole motor near the drill bit, or by both methods.

Drilling fluid, termed mud, is pumped by mud recirculation equipment 16 through a supply pipe 18, through the kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For a logging while drilling (LWD) environment, downhole sensors 26 are located in the drillstring 8 near the drill bit 14. The sensors 26 may include directional instrumentation and LWD tools such as an acoustic logging tool. In addition, a magnetometer, accelerometer, gyroscope, or other sensors may be incorporated to perform position measurements and further refine the orientation measurements. In some embodiments, downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques may also be used. The receiver 30 communicates the telemetry to an acquisition module 36 coupled to a data processing system 50.

The data processing system 50 includes internal data storage and memory having software (represented by removable information storage media 52), along with one or more processor cores that execute the software. The software configures the system to interact with a user via one or more input/output devices (such as a keyboard 54 and a display 56). Among other things, the system 50 processes data received from the acquisition module 36 and generates a representative display for the driller to perceive. For example, the driller may interact with an anisotropy color map visualization that is output and displayed.

FIG. 2 shows a contextual view of an illustrative wireline embodiment. A logging truck 102 may suspend a wireline logging tool 104 on a wireline cable 106 having conductors for transporting power to the tool 104 and telemetry from the tool 104 to the surface. The tool 104 may include depth sensors, temperature sensors, pressure sensors, and the like that collect downhole measurements for formation inspection and evaluation including acoustic measurements. On the surface, a computer 108 acquires and stores measurement data from the tool 104 as a function of position along the borehole 112 and optionally as a function of azimuth. Though shown as an integrated part of the logging truck 102, the computer 108 can take different forms including a tablet computer, laptop computer, desktop computer, and virtual cloud computer, and executes software to carry out necessary processing and enable a user to view and interact with a display of the resulting information. Specifically, one or more processors coupled to memory may execute the software. The software may collect the data and organize it in a file or database. The software may respond to user input via a keyboard or other input mechanism to display data as an image or movie on a monitor or other output mechanism such as a printer. The software may process the data to optimize visualization as described below. In this way, a multi-dimensional representation of the surrounding formation may be obtained, processed, and displayed. Furthermore, the software may issue an audio or visual alert to direct the user's attention to a particular location, result, or piece of data. The processor may perform any appropriate step described below. In at least one embodiment, the tool 104 itself may include a processor coupled with memory to obtain, store, and process measurement data taken by the sensors.

Figure 3:
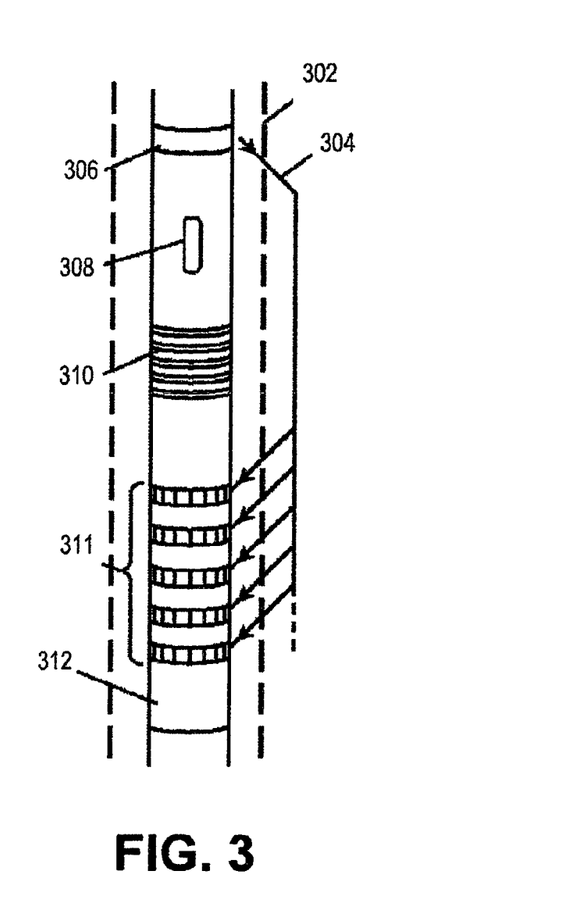
FIG. 3 is a side view of an illustrative acoustic tool.

FIG. 3 shows an illustrative LWD embodiment of acoustic logging tool 312 in a borehole 302. The tool 312 makes up a portion of the drill string, the rest of which is not shown. The tool 312 includes a monopole acoustic source 306, an acoustic isolator 310, an array of acoustic receivers 311, and a multi-pole source 308. The multi-pole source 308 may be a dipole, crossed-dipole, quadrupole, hexapole, or higher-order multi-pole transmitter. The tool 312 may include an acoustic source that is configurable to generate different wave modes.

The sources 306, 308 are designed to generate acoustic waves 304 that propagate through the formation and are detected by the receiver array 311. The monopole acoustic source 306 may be made up of piezoelectric elements or other transducers suitable for generating acoustic waves in downhole conditions. The contemplated operating frequencies for the tool 312 are in the range between 0.5 kHz and 30 kHz, inclusive.

The acoustic isolator 310 may attenuate and delay acoustic waves that propagate through the body of the tool from the monopole acoustic source 306 to the receiver array 311. Although five receivers are shown in the receiver array 311, the number of receivers may vary from one to sixteen or more. Each receiver may include one or more piezoelectric elements that convert acoustic waves into an electrical signal that is amplified and converted to a digital signal. The digital signal may be measured by an internal controller for processing, storage, and/or transmission to an uphole computing facility.

Figure 4:
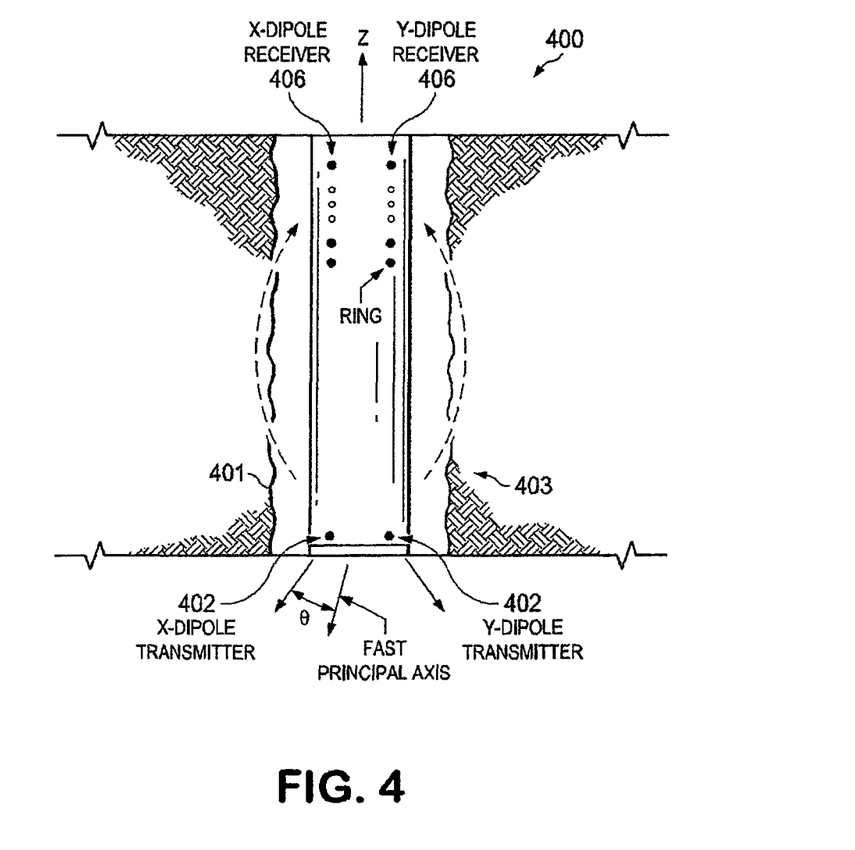
FIG. 4 is a schematic cross-section of an illustrative acoustic tool.

FIG. 4 shows a cross-dipole acoustic tool 400 in a borehole 401 aligned along the z-axis of the borehole 401. The tool 400 includes two azimuthally orthogonal dipole-transmitters 402 and two azimuthally orthogonal dipole-receiver arrays 406. Specified in the traditional way, the recorded acoustic waveforms are denoted by in-line components, (XX, YY), and cross-line components, (XY, YX). The first letter refers to the transmitter, and the second letter to the receiver. Thus, for example, an XY recorded waveform is formed by firing the X-directed dipole transmitter and receiving at a Y-directed dipole receiver. The X and Y receiver arrays 406 are aligned along the z-axis such that the azimuthally orthogonal receivers are denoted as a ring. The fast principal wave axis of the formation 403 is directed at an angle θ relative to the x-axis. These waveforms form part of the initial input in the generation of the anisotropy color maps as shown in FIG. 5.

Figure 5:
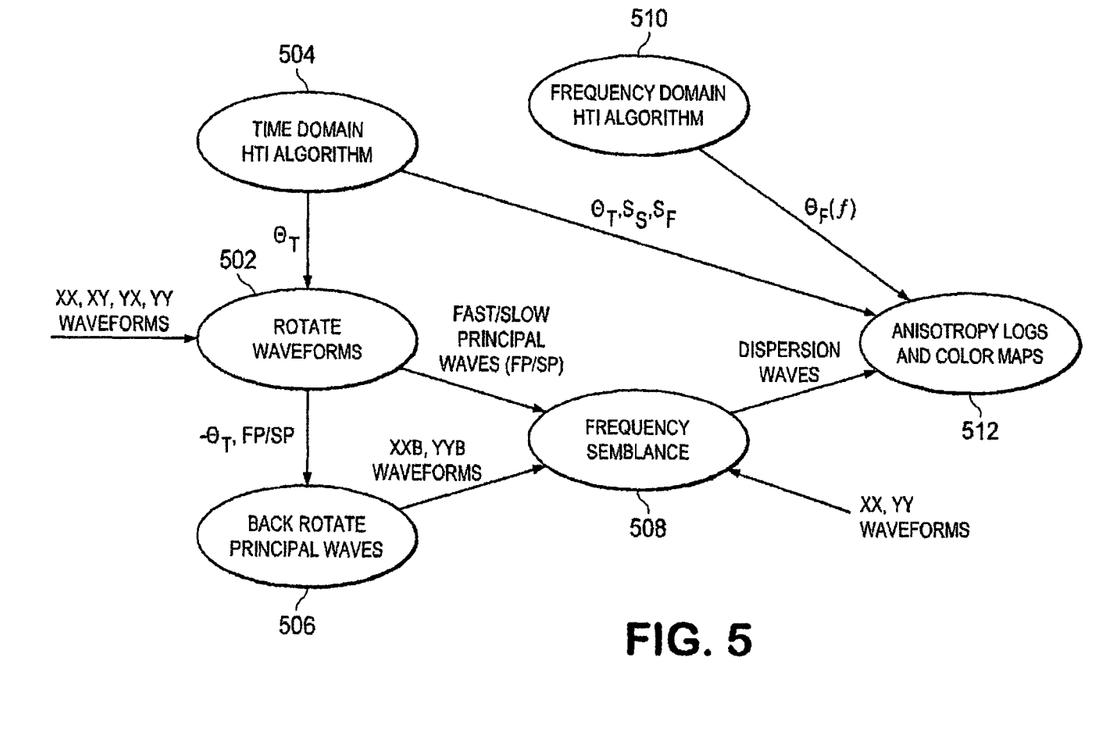
FIG. 5 is a diagram showing inputs and outputs to various processes that are used in an illustrative anisotropy color map visualization method.

FIG. 5 shows inputs and outputs to various processes that ultimately result in generation of anisotropy color maps. In addition to the waveforms, a time-domain process 504 and frequency-domain process 510 provide another part of the initial input as described in X. M. Tang, A. Cheng, "Quantitative Borehole Acoustic Methods," Handbook of Geophysical Exploration: Seismic Exploration, pp. 159-164, Vol. 24, 2004. Specifically, the inputs provided by the time-domain process 504 are the time-domain HTI angle, $\theta_T$, and fast and slow slowness values, $S_S$ and $S_F$. The input provided by the frequency-domain process 510 is the frequency-domain HTI angle, $\theta_F(f)$.

The XX, XY, YX, and YY waveforms and $\theta_T$ are used as inputs to a rotation process 502. For example, the Alford rotation process assumes the waveforms transform as a second order tensor. The rotation process may be expressed as follows:

$$T^T X^j T = D^j \qquad \text{(Eq.1)}$$

where $$T(\theta) = \begin{bmatrix} \cos\theta & -\sin\theta \\ \sin\theta & \cos\theta \end{bmatrix} \equiv \begin{bmatrix} c_\theta & -s_\theta \\ s_\theta & c_\theta \end{bmatrix} \qquad \text{(Eq.2)}$$

$$X^j = \begin{bmatrix} XX_j & XY_j \\ YX_j & YY_j \end{bmatrix} \qquad \text{(Eq.3)}$$

$$D^j = \begin{bmatrix} FP_j & 0 \\ 0 & SP_j \end{bmatrix} \qquad \text{(Eq.4)}$$

The real orthonormal matrix, $T(\theta)$, describes the Alford rotation. $XX_j$, $YY_j$, $XY_j$, and $YX_j$ are the in-line and cross-line waveforms from transmitter to receiver ring n, and j represents a particular data point. $FP_j$ and $SP_j$ are the fast and slow principal waves associated with the particular point.

The fast and slow principal waves, along with $-\theta_T$, are used as inputs to a backrotation process 506. In practice, the zero values in (Eq.4) are actually small non-zero values because of correlated and uncorrelated noise. The backrotation process 506 sets these values to zero and verifies the quality of the recorded waveforms by attempting to derive them via inverse transformation. Hence, the fast and slow principal waves and $-\theta_T$, the results of the rotation process 502, are needed. If the derived, or backrotated, waveforms, XXB and YYB, are similar to the recorded waveforms, XX and YY, the quality of the recorded waveforms is high, i.e., noise is not a significant problem.

Figure 6:
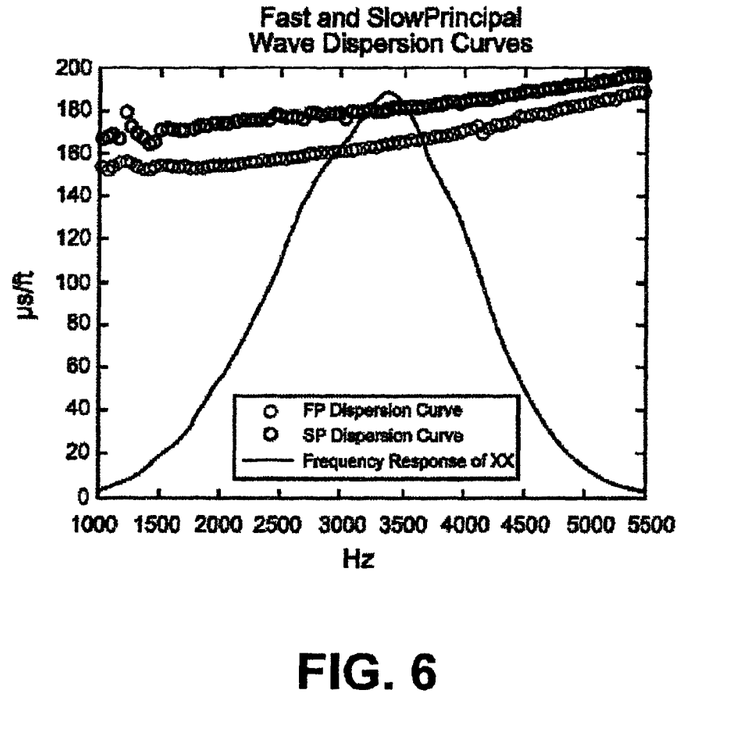
FIG. 6 is a graph of illustrative fast and slow principal wave dispersion curves.

The backrotated waveforms, XXB and YYB; the fast and slow principal waves; and recorded waveforms, XX and YY; are used as inputs to a frequency semblance process 508, which results in dispersion curves. Dispersion curves plot slowness as a function of frequency for the fast and slow principal waves. FIG. 6 shows example dispersion curves where the fast wave has a slowness of about 155 μs/ft., and the slow wave has a slowness of about 175 μs/ft. The frequency semblance process 508 may be a matrix pencil process as described in Sarkar, T. K. and Pereira, O., 1995, "Using the Matrix Pencil Method to Estimate the Parameters of a Sum of Complex Exponentials," I.E.E.E. Antennas and Propagation Magazine, 37(1), pp. 48-55.

The dispersion curves; time-domain angle, $\theta_T$; fast and slow slowness values, $S_S$ and $S_F$; and frequency-domain angle, $\theta_F(f)$, are used as inputs in a process 512 to generate anisotropy logs, which will be used to create color maps. Each log may include a waveform attribute as a function of depth and frequency. The attributes may be relative angle, signed percent anisotropy, backrotation similarity, and the like.

The time and frequency angles, $\theta_T$ and $\theta_F(f)$, may be used to create a relative angle log. Because the anisotropy angle in the formation defines a plane, angles separated by 180 degrees are physically equivalent. Thus, the time and frequency angles are modulo 180 degrees. The relative angle attribute log may be determined using the following:

$$RA(f) = \begin{cases} |-90° < \mod(\theta_F(f) - \theta_T, 180°) \le 90°|, & \text{for } f_{min} < f < f_{max} \\ -1, & \text{for } f < f_{min} \text{ or } f > f_{max} \end{cases} \qquad \text{(Eq.5)}$$

where $f_{min}$ and $f_{max}$ are the bounds of the output of the frequency-domain process 510. Frequencies outside these bounds are not processed because of poor signal-to-noise ratio or other criterion that invalidates the data. Alternatively, the bounds may be determined in other ways. For example, the bounds may be determined as the frequencies where the normalized frequency response of the waveforms equals a threshold according to:

$$\frac{\Sigma_m(|XX_{m,f}|^2 + |XY_{m,f}|^2 + |YX_{m,f}|^2 + |YY_{m,f}|^2)}{\max_f \{\Sigma_m(|XX_{m,f}|^2 + |XY_{m,f}|^2 + |YX_{m,f}|^2 + |YY_{m,f}|^2)\}} = \text{threshold} \qquad \text{(Eq.6)}$$

Figure 7:
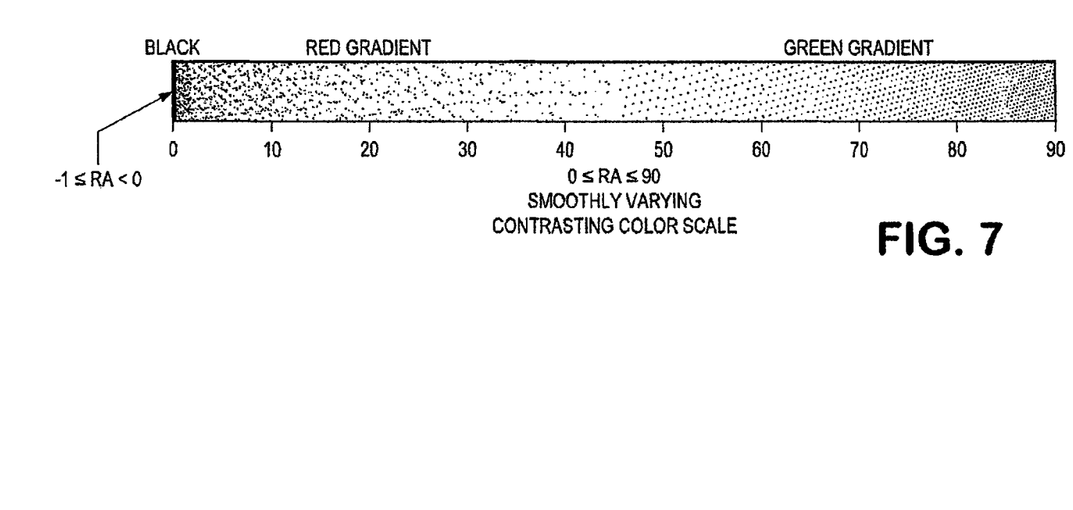
FIG. 7 is a scale showing an illustrative mapping of relative angle values to two color gradients and a third out-of-bounds color.

In equation (Eq.5), the out-of-bounds value of RA(f) is set to −1, but may be any number not contained in the valid range (0, 90). The relative angle color map may be generated from the relative angle log by mapping the relative angle values to colors in one or more color gradients, and mapping out-of-bounds values to a separate color. For example, FIG. 7 illustrates a relative angle color mapping where the out-of-bounds color is a solid color that is easy to differentiate from the rest of the scale. Specifically, black is used to represent relative angle values between −1 and 0, which makes up a small portion of the entire scale, the rest of which includes relative angle values between 0 and 90. By limiting the invalid data, e.g. by setting the value of invalid data, the bulk of the scale is reserved for valid data.

The rest of the scale includes two color gradients. The first gradient shown is a red gradient; specifically, one extreme of the gradient is red at the relative angle value of 0. Higher relative angle values are mapped to lighter shades of red until the lightest shade is reached at or near a relative angle of 45. The second gradient shown is a green gradient; specifically, one extreme of the gradient is green at the relative angle value of 90. Lower relative angle values are mapped to lighter shades of green until the lightest shade is reached at or near a relative angle of 45. Other colors, amount, and scale of gradients may be used as desired.

Figure 10:
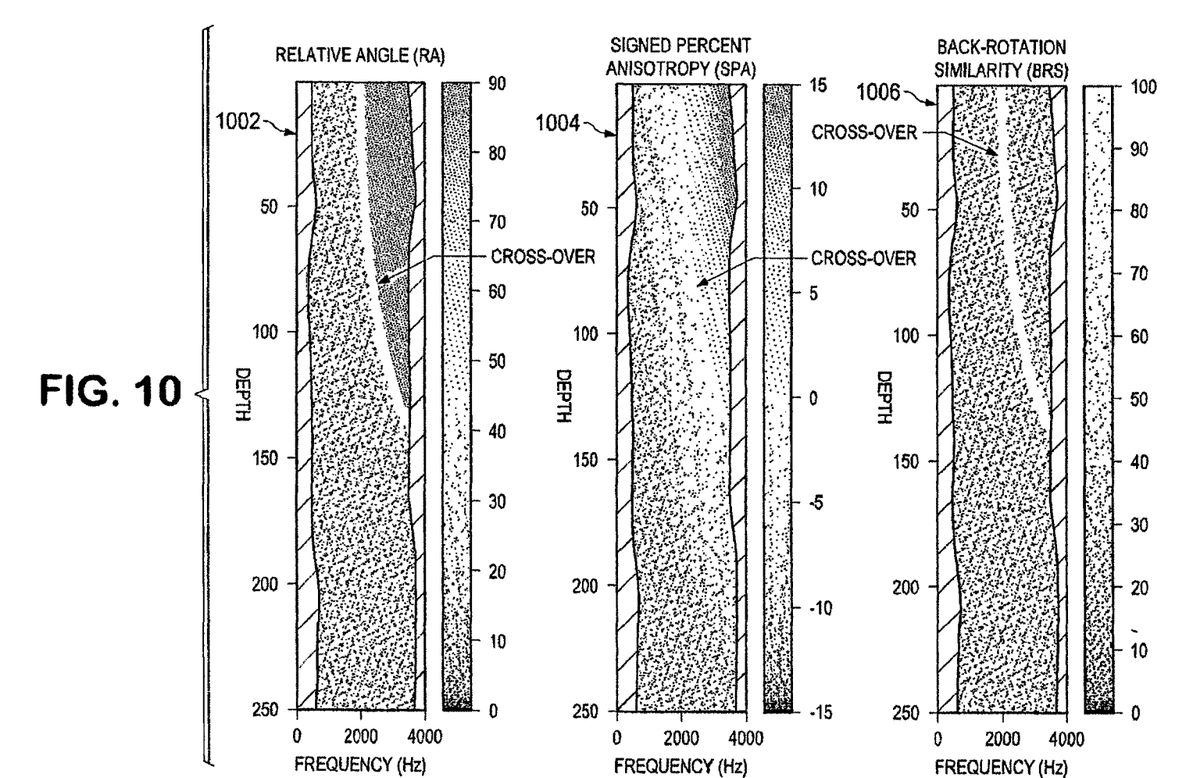
FIG. 10 shows three illustrative anisotropy color map visualizations.

The scale of FIG. 7 applied to the relative angle anisotropy log results in a relative angle color map 1002 shown in FIG. 10. The color map 1002 shows relative angle as a function of frequency and depth. A majority of relative angles are fully red, i.e., near 0. A smaller number of relative angles are fully green, i.e., near 90. A thin line of relative angles separate the red and green portions of the color map, and are very light, i.e., near 45. The green portion of the color map 1002 indicates weak or no anisotropy, or indicates a dispersion curve intersection due to in situ stress. The light portion of the color map 1002 indicates weak or no anisotropy, or indicates inconsistency between the time and frequency domain results. The red portion of the color map 1002 indicates anisotropy.

Returning to FIG. 5, the dispersion curves may be used to create a signed percent anisotropy log in process 512. The signed percent anisotropy log may be determined using:

$$SPA(f) = 200 * \frac{(S_{FP}(f) - S_{SP}(f))}{(S_S + S_F)}, \quad \text{(Eq.7)}$$

for $f_{min} < f < f_{max}$ where $f_{min}$ and $f_{max}$ are the bounds of the output of the frequency-domain process 510, and $S_{FP}(f)$ and $S_{SP}(f)$ are the dispersion curves of the fast and slow principal waves as illustrated in FIG. 6. A threshold ceiling, AMAX, may be set on SPA(f) even if within the frequency bounds. Should a determined value exceed this threshold, the value may be reset according to:

if $|SPA(f)|>A$MAX, set $SPA(f)=\text{sign}(SPA(f))*A$MAX, for $f_{min} < f < f_{max}$ (Eq.8)

Figure 8:
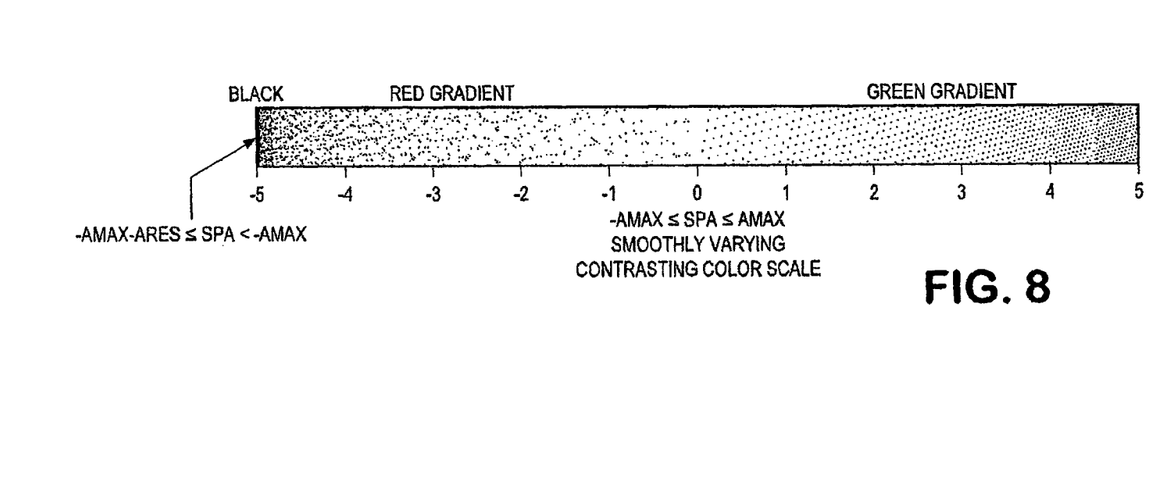
FIG. 8 is a scale showing an illustrative mapping of signed percent values to two color gradients and a third out-of-bounds color.

The value of SPA(f) outside the frequency bounds is set to $SPA(f)=-A$MAX$-ARES$, for $f < f_{min}$ or $f > f_{max}$ (Eq.9)

where, similar to the relative angle anisotropy log, ARES is a number chosen to assign invalid results to a relatively small portion of the scale. The signed percent anisotropy color map may be generated from the signed percent anisotropy log by mapping the signed percent anisotropy values to colors in one or more color gradients, and mapping out-of-bounds values to a separate color. For example, FIG. 8 illustrates a signed percent anisotropy color mapping where the out-of-bounds color is a solid color that is easy to differentiate from the contrasting scale. Specifically, black is used to represent invalid signed percent anisotropy values, which makes up a small portion of the entire scale, the rest of which includes signed percent anisotropy values between −AMAX and AMAX, here −5 and 5 respectively.

The rest of the scale includes two color gradients. The first gradient shown is a red gradient; specifically, one extreme of the gradient is red at the signed percent anisotropy value of −5. Higher signed percent anisotropy values are mapped to lighter shades of red until the lightest shade is reached at or near a signed percent anisotropy value of 0. The second gradient shown is a green gradient; specifically, one extreme of the gradient is green at the signed percent anisotropy value of 5. Lower signed percent anisotropy values are mapped to lighter shades of green until the lightest shade is reached at or near a signed percent anisotropy value of 0. Other colors, amount, and scale of gradients may be used as desired.

The scale of FIG. 8 applied to the signed percent anisotropy log results in a relative angle color map 1004 shown in FIG. 10. The color map 1004 shows signed percent anisotropy as a function of frequency and depth. The fully red portions of the color map 1004 indicate negative anisotropy with a magnitude near −AMAX, which itself indicates that the fast principal wave is faster than the slow principal wave. The fully green portions of the color map 1004 indicate positive anisotropy with a magnitude near AMAX, which itself indicates that the fast principal wave is actually slower than the slow principal wave. Lighter portions of the color map 1004 indicate weak anisotropy relative to AMAX. In at least one embodiment colors chosen for the relative angle color map 1002 and the signed percent anisotropy color map 1004 are the same. Accordingly, a comparison of color maps 1002, 1004 may be performed. Specifically, if the color maps 1002, 1004 look qualitatively similar, then the time and frequency domain processes are consistent with one another. This consistency indicates the quality of the anisotropy results is high.

Figure 9:
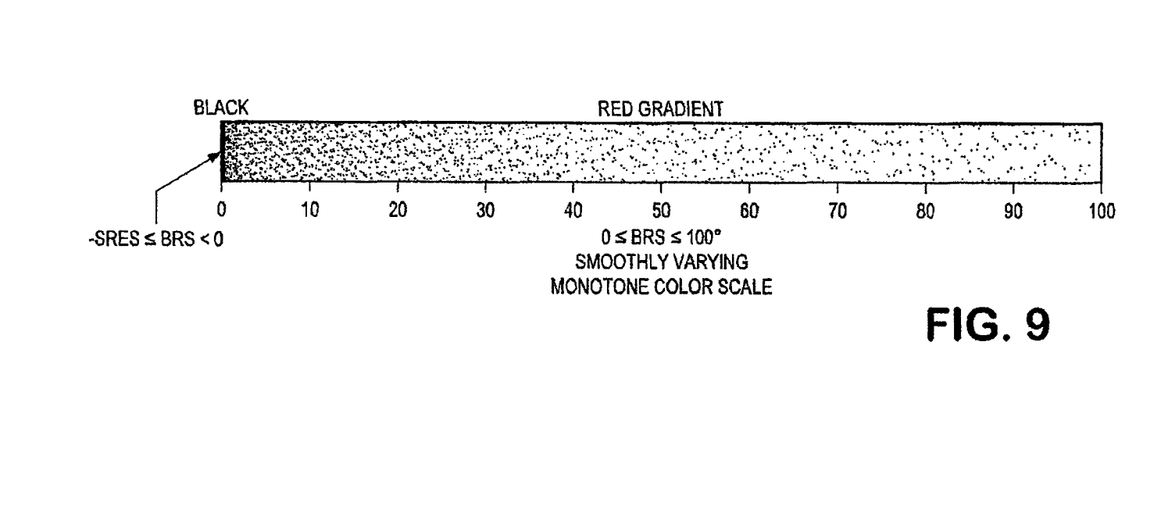
FIG. 9 is a scale showing an illustrative mapping of backrotation similarity values to a color gradient and a second out-of-bounds color.

Returning to FIG. 5, the recorded waveforms, XX and YY; the backrotated waveforms, XXB and YYB; and the fast and slow slowness values, $S_S$ and $S_F$, may be used to create a backrotation similarity log in process 512. The backrotation similarity log may be determined using:

$$BRS = \begin{cases} 100 * \frac{\max(|S_{XXB}(f) - S_{XX}(f)|, |S_{YYB}(f) - S_{YY}(f)|)}{\max(SRES, |S_{FP}(f) - S_{SP}(f)|)}, & \text{for } f_{min} < f < f_{max} \\ -1, & \text{for } f < f_{min} \text{ or } f > f_{max} \end{cases} \quad \text{(Eq.10)}$$

where $f_{min}$ and $f_{max}$ are the bounds of the output of the frequency-domain process 510, $S_{XX}(f)$ and $S_{YY}(f)$ are the dispersion curves of the XX and YY waveforms, and $S_{XXB}(f)$ and $S_{YYB}(f)$ are the dispersion curves of the backrotated waveforms. Frequencies outside these bounds are not processed because of poor signal-to-noise ratio or other criterion that invalidates the data. If the determined BRS exceeds a desired maximum allowed value, then it is reset to this maximum value. The out-of-bounds value of BRS is set to −1 in equation (Eq.10), but may be any number not contained in the valid range (0, 100). The BRS color map may be generated from the BRS log by mapping the BRS values to colors in at least one color gradient, and mapping out-of-bounds values to a separate color. For example, FIG. 9 illustrates a BRS color mapping where the out-of-bounds color is a solid color that is easy to differentiate from the contrasting scale. Specifically, black is used to represent invalid BRS values between 0 and −SRES, which makes up a small portion of the entire scale, the rest of which includes BRS values between 0 and 100. SRES is a small number used to make the BRS well defined at dispersion curve cross-overs, i.e. where the denominator in equation 10 is zero. In FIG. 9, SRES is slightly larger than one so the color mapping includes the invalid value, −1.

The rest of the scale includes a single color gradient. The gradient shown is a red gradient; specifically, one extreme of the gradient is red at the BRS value of 0. Higher BRS values are mapped to lighter shades of red until the lightest shade is reached at or near a BRS value of 100. Other colors, amount, and scale of gradients may be used as desired.

The scale of FIG. 9 applied to the backrotation similarity log results in a BRS color map 1006 shown in FIG. 10. The color map 1006 shows BRS values as a function of frequency and depth. A majority of BRS values are red, i.e., near 0. A thin line of lighter BRS values separate the red portions of the color map, and are very light, i.e., near 100. The lighter portions of the color map 1006 indicate a rotated dispersion curve cross-over, weak/no anisotropy, or a bad fit to the original recorded XX and YY dispersion curves.

FIG. 10 shows three color maps: the relative angle ("RA") color map 1002, the signed percent anisotropy ("SPA") color map 1004, and the backrotation similarity ("BRS") color map 1006, for comparison. The upper depths of the RA map 1002 show a good match between the time and frequency domain angles at low frequency. A clear 90 degree sharp change occurs at higher frequencies. The cross-over appears as a narrow white curve. Thus, the anisotropy is stress induced. The deeper section shows a good match between the time and frequency domain angles at all valid frequencies indicating the anisotropy is intrinsic.

The SPA map 1004 is qualitatively the same as the RA map 1002, confirming that the HTI time and frequency processes are consistent with one another. The SPA map 1004 shows the same cross-over curve, confirming the identification of anisotropy type. The SPA map 1004 also gives a quick visual identification of the degree of anisotropy.

The BRS map 1006 shows the same cross-over curve as the other two maps 1002, 1004. The BRS map 1006 shows that the original and backrotated waveform dispersion curves are very similar relative to the amount of anisotropy present, confirming that noise is not appreciably affecting the measurements.

Other attributes besides relative angle, signed percent anisotropy, and backrotation similarity may be displayed as color coded images with depth and frequency axes. For example, the fast and slow dispersion curves themselves are attributes that could be displayed.

Figure 11:
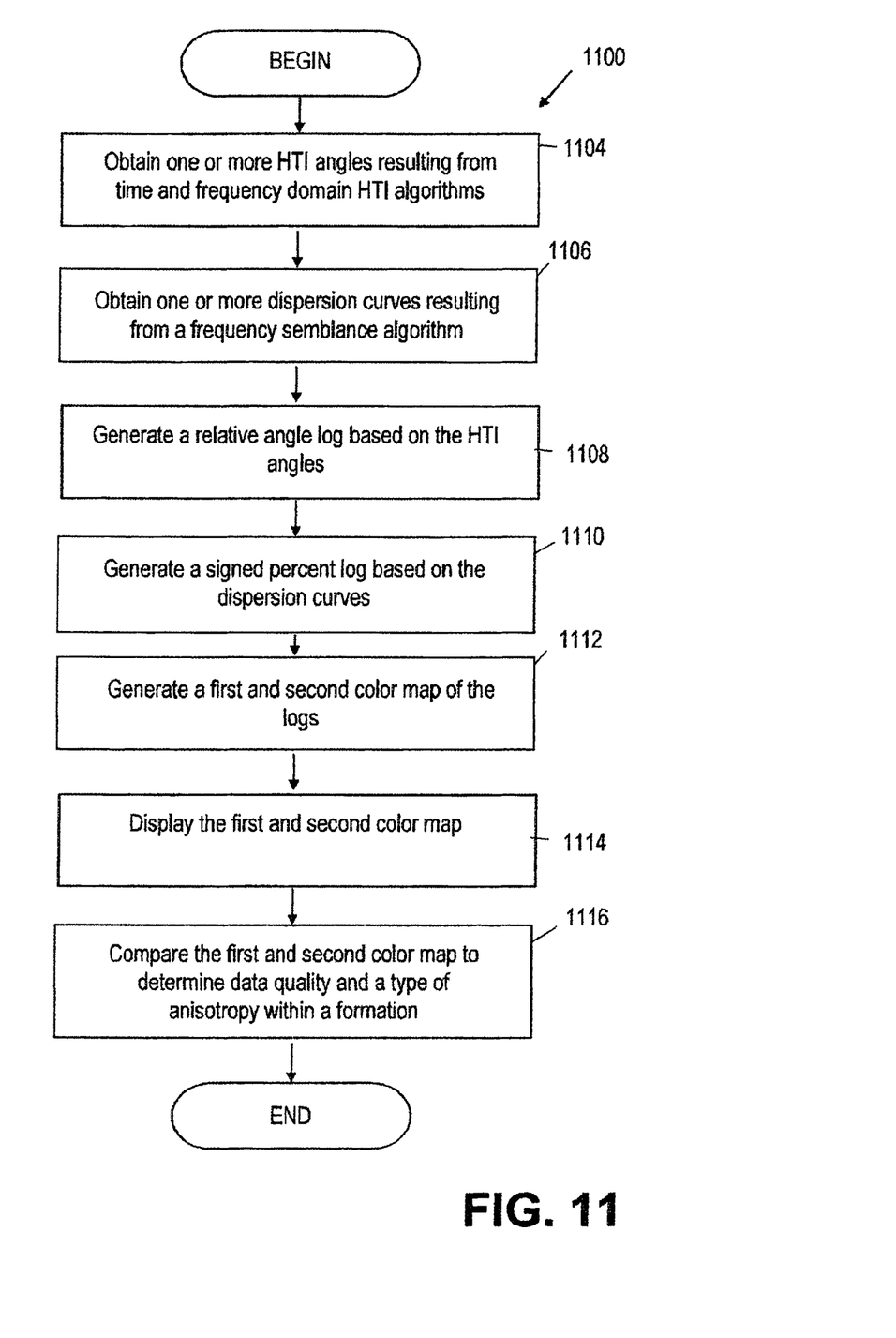
FIG. 11 is a flow diagram of an illustrative method of generating anisotropy color map visualizations.

FIG. 11 is a flow diagram of an illustrative method 1100 of generating anisotropy color map visualizations that may include any appropriate step described above. At 1104, HTI angles resulting from a time-domain HTI algorithm are obtained. Time-domain algorithms typically process the waveforms within a time window starting at the beginning of the flexural mode arrival and provide a single angle. Additionally, one or more second HTI angles resulting from a frequency domain HTI algorithm are obtained. Frequency-domain algorithms process the waveforms over a set of frequencies and provide angles as a function of frequency.

At 1106, dispersion curves resulting from a frequency semblance algorithm are obtained. Dispersion curves plot slowness as a function of frequency for the fast and slow principal waves. FIG. 6 shows example dispersion curves where the fast wave has a slowness of about 155 µs/ft., and the slow wave has a slowness of about 175 µs/ft. The frequency semblance process 508 may be a matrix pencil process as described in Sarkar, T. K. and Pereira, O., 1995, "Using the Matrix Pencil Method to Estimate the Parameters of a Sum of Complex Exponentials," I.E.E.E. Antennas and Propagation Magazine, 37(1), pp. 48-55.

At 1108, a first HTI anisotropy log, such as a relative angle log, is generated based on the first and second HTI angles. For example, the relative angle log may be generated based on (Eq.5) above. At 1112, a second HTI anisotropy log, such as a signed percent log, is generated based on the dispersion curves. For example, the signed percent log may be generated based on (Eq.7) above.

At 1112, a first color map of the first HTI anisotropy log is generated as a function of frequency and depth. Generating the first color map may include mapping colors to relative angle values by selecting a color from one or more color gradients to map to a particular relative angle value based on the sign and magnitude of the value. For example, the mapping may be performed according to FIG. 7.

Additionally, a second color map of the second HTI anisotropy log is generated. Generating the second color map as a function of frequency and depth may include mapping colors to signed percent values by selecting a color from one or more color gradients to map to a particular signed percent value based on the sign and magnitude of the value. For example, the mapping may be performed according to FIG. 8. In at least one embodiment, the color gradients are the same as the color gradients used in the first color map. For example, one extremity of the color gradients may be mapped to matching angles in the first color map and a threshold of negative anisotropy in the second color map. Similarly, one extremity of the color gradients may be mapped to out of phase angles in the first color map and a threshold of positive anisotropy in the second color map.

Additionally, a third HTI anisotropy log and color map as a function of frequency and depth may be generated. For example, a backrotation similarity log may be generated according to (Eq.10). The third color map may also be generated. Specifically, various backrotation similarity values may be mapped according to the scale of FIG. 9.

At 1114, the first and second color map are displayed. For example, the color maps may be displayed together according to FIG. 10. At 1116, the first color map is compared to the second color map to efficiently determine data quality or to determine a type of anisotropy within a formation as a function of depth. The much less efficient alternative involves consecutively analyzing many individual depths for the presence of stress-induced anisotropy by plotting an overlay of the fast and slow dispersion curves at each depth according to FIG. 6. Visual inspection of the dispersion curves for a cross-over in slowness is indicative of stress-induced anisotropy. Attempting to analyze one chart per depth is cumbersome. Contrastingly, the color maps are a much more efficient means of analyzing large well sections including multiple depths for cross-over characteristics. If there is no cross-over, then the anisotropy may be due to another cause such as intrinsic anisotropy.

In at least one embodiment, an acoustic logging method includes obtaining first horizontal transverse isotropy ("HTI") angles resulting from a time domain HTI algorithm. The method further includes obtaining one or more second HTI angles resulting from a frequency domain HTI algorithm. The method further includes generating a first HTI anisotropy log including a relative angle log based on the first and second HTI angles. The method further includes generating a first color map of the first HTI anisotropy log and displaying the first color map.

In another embodiment, an acoustic logging system includes a cross-dipole acoustic tool to measure characteristics of a formation. The system further includes one or more processors coupled to the tool to obtain first HTI angles resulting from a time domain HTI algorithm, obtain one or more second HTI angles resulting from a frequency domain HTI algorithm, generate a first HTI anisotropy log corresponding to the formation comprising a relative angle log based on the first and second HTI angles, and generate a first color map of the first HTI anisotropy log. The system further includes a display coupled to at least one of the one or more processors to display the first color map.

In another embodiment, an acoustic logging method includes obtaining azimuthally-dependent slowness measurements from an acoustic logging tool conveyed along a borehole through a formation. The method further includes deriving from the measurements at least one acoustic anisotropy attribute as a function of frequency and borehole position. The method further includes generating a visual representation of the at least one acoustic anisotropy attribute's dependence on frequency and borehole position. The method further includes storing or displaying the visual representation.

The following features may be incorporated into the various embodiments. The dispersion curves may result from a frequency semblance algorithm. A second HTI anisotropy log may be generated including a signed percent log based on the dispersion curves. A second color map of the second HTI anisotropy log may be generated. The second color map may be displayed. The first color map may be compared to the second color map to determine data quality or to determine a type of anisotropy within a formation. Generating the first color map may include mapping colors to relative angle values. Mapping colors to relative angle values may include selecting a color from one or more color gradients to map to a particular relative angle value based on the magnitude of the value. Generating the second color map may include mapping colors to signed percent values. Mapping colors to signed percent values may include selecting a color from one or more color gradients to map to a particular signed percent value based on the sign and magnitude of the value. Generating the first color map may include mapping colors to relative angle values using one or more color gradients, and generating the second color map may include mapping colors to signed percent values using the same color gradients. One extremity of the color gradients may be mapped to matching angles in the first color map and a threshold of negative anisotropy in the second color map. One extremity of the color gradients may be mapped to out of phase angles in the first color map and a threshold of positive anisotropy in the second color map. A third HTI anisotropy log may be generated including a backrotation similarity log based on in-line acoustic waveform components backrotated estimates of the in-line acoustic waveform components. A third color map of the third HTI anisotropy log may be generated, and the third color map may be displayed. A first set of HTI angles may be obtained resulting from a time domain HTI algorithm. One or more second HTI angles may be obtained resulting from a frequency domain HTI algorithm. A second HTI anisotropy log may be generated including a relative angle log based on the first and second HTI angles. A second color map of the second HTI anisotropy log may be generated. The second color map may be displayed. The visual representation may be a color map that uses one or more color gradients to represent values. The method acoustic anisotropy attribute may be a difference between a time-domain Alford rotation angle and a frequency-dependent Alford rotation angle. The acoustic anisotropy attribute may be a signed percent difference between frequency-dependent slowness of fast and slow principal waves.

While the present disclosure has been described with respect to a limited number of embodiments, those skilled in the art will appreciate numerous modifications and variations therefrom. It is intended that the appended claims cover all such modifications and variations.

What is claimed is:

1. A logging method comprising:
   obtaining first horizontal transverse isotropy ("HTI") angles resulting from a time domain HTI algorithm, based, at least in part, on measurements of formation characteristics from a logging tool;
   obtaining one or more second HTI angles resulting from a frequency domain HTI algorithm;
   generating a first HTI anisotropy log comprising a relative angle log based on the first and second HTI angles;
   generating a first color map of the first HTI anisotropy log; and
   displaying the first color map.

2. The method of claim 1, further comprising:
   obtaining dispersion curves resulting from a frequency semblance algorithm;
   generating a second HTI anisotropy log comprising a signed percent log based on the dispersion curves;
   generating a second color map of the second HTI anisotropy log; and
   displaying the second color map.

3. The method of claim 2, further comprising comparing the first color map to the second color map to determine data quality or to determine a type of anisotropy within a formation.

4. The method of claim 1, wherein generating the first color map comprises mapping colors to relative angle values.

5. The method of claim 4, wherein mapping colors to relative angle values comprises selecting a color from one or more color gradients to map to a particular relative angle value based on the magnitude of the value.

6. The method of claim 2, wherein generating the second color map comprises mapping colors to signed percent values.

7. The method of claim 6, wherein mapping colors to signed percent values comprises selecting a color from one or more color gradients to map to a particular signed percent value based on the sign and magnitude of the value.

8. The method of claim 2, wherein generating the first color map comprises mapping colors to relative angle values using one or more color gradients and wherein generating the second color map comprises mapping colors to signed percent values using the same color gradients.

9. The method of claim 8, wherein one extremity of the color gradients is mapped to matching angles in the first color map and a threshold of negative anisotropy in the second color map.

10. The method of claim 8, wherein one extremity of the color gradients is mapped to out of phase angles in the first color map and a threshold of positive anisotropy in the second color map.

11. The method of claim 2, further comprising
    generating a third HTI anisotropy log comprising a backrotation similarity log based on in-line acoustic waveform components backrotated estimates of the in-line acoustic waveform components;
    generating a third color map of the third HTI anisotropy log; and
    displaying the third color map.

12. The method of claim 1, further comprising: measuring one or more characteristics of formation with a downhole tool; performing a time domain HTI algorithm on the measured characteristics; and performing a frequency domain HTI algorithm on the measured characteristics.

13. A logging system comprising:
a logging-tool to measure characteristics of a formation; and
one or more processors coupled to the logging tool to:
obtain first horizontal transverse isotropy ("HTI") angles resulting from a time domain HTI algorithm performed on the measured characteristics;
obtain one or more second HTI angles resulting from a frequency domain HTI algorithm performed on the measured characteristics;
generate a first HTI anisotropy log corresponding to the formation comprising a relative angle log based on the first and second HTI angles; and
generate a first color map of the first HTI anisotropy log; and
a display coupled to at least one of the one or more processors to display the first color map.

14. The system of claim 13, wherein the processor:
obtains dispersion curves resulting from a frequency semblance algorithm;
generates a second HTI anisotropy log comprising a signed percent log based on the dispersion curves; and
generates a second color map of the second HTI anisotropy log,
wherein the display displays the second color map.

15. The system of claim 13, wherein the logging tool is a cross-dipole acoustic tool.

16. The system of claim 13, wherein generating the first color map causes the processor to map colors to relative angle values using one or more color gradients and wherein generating the second color map causes the processor to map colors to signed percent values using the same color gradients.

17. The system of claim 16, wherein the processor maps one extremity of the color gradients to matching angles in the first color map and a threshold of negative anisotropy in the second color map.

18. The system of claim 16, wherein the processor maps one extremity of the color gradients to out of phase angles in the first color map and a threshold of positive anisotropy in the second color map.

19. A logging method comprising:
obtaining azimuthally-dependent slowness measurements from a logging tool conveyed along a borehole through a formation;
deriving from the measurements at least one acoustic anisotropy attribute as a function of frequency and borehole position;
generating a visual representation of the at least one acoustic anisotropy attribute's dependence on frequency and borehole position; and
storing or displaying the visual representation.

20. The method of claim 19, wherein the visual representation is a color map that uses one or more color gradients to represent values.

21. The method of claim 19, wherein the acoustic anisotropy attribute is a difference between a time-domain Alford rotation angle and a frequency-dependent Alford rotation angle.

22. The method of claim 19, wherein the acoustic anisotropy attribute is a signed percent difference between frequency-dependent slowness of fast and slow principal waves.

* * * * *